US012782672B2

(12) United States Patent
Lin et al.

(10) Patent No.: US 12,782,672 B2
(45) Date of Patent: Nov. 3, 2026

(54) DRIVING MECHANISM

(71) Applicant: Actutek Corporation, Taoyuan City (TW)

(72) Inventors: Yi-Chieh Lin, Taoyuan City (TW); Kun-Shih Lin, Taoyuan City (TW); Shao-Chung Chang, Taoyuan City (TW); Wei-Han Hsia, Taoyuan City (TW); Wei-Pin Chin, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 707 days.

(21) Appl. No.: 17/740,626

(22) Filed: May 10, 2022

(65) Prior Publication Data

US 2022/0357554 A1 Nov. 10, 2022

Related U.S. Application Data

(60) Provisional application No. 63/186,496, filed on May 10, 2021.

(51) Int. Cl.

*G02B 7/08* (2021.01)
*G02B 7/00* (2021.01)
*G02B 7/02* (2021.01)
*G02B 7/09* (2021.01)
*G02B 15/14* (2006.01)

(Continued)

(52) U.S. Cl.

CPC ............... *G02B 7/08* (2013.01); *G02B 7/005* (2013.01); *G02B 7/021* (2013.01); *G02B 7/022* (2013.01); *G02B 7/023* (2013.01); *G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search

CPC .......... G02B 7/00; G02B 15/00; G02B 7/005; G02B 7/021; G02B 7/022; G02B 7/0263; G02B 7/09; G03B 5/02; G03B 2205/0061; H04N 23/54; H04N 23/55

USPC .......................................................... 359/822

See application file for complete search history.

(56) References Cited

U.S. PATENT DOCUMENTS

2011/0103782 A1* 5/2011 Tsuruta .................. H04N 23/55 359/557
2015/0309282 A1* 10/2015 Lee ...................... G02B 27/646 359/814

FOREIGN PATENT DOCUMENTS

CN 208110139 U 11/2018
JP 2015225314 A 12/2015
TW I457693 B 10/2014

OTHER PUBLICATIONS

An Office Action in corresponding CN Application No. 202210508591.8 issued on Jun. 14, 2025 is attached, 7 pages.

* cited by examiner

*Primary Examiner* — Bumsuk Won
*Assistant Examiner* — Grant A Gagnon
(74) *Attorney, Agent, or Firm* — MUNCY, GEISSLER, OLDS & LOWE, P.C.

(57) ABSTRACT

A driving mechanism for driving an optical element is provided, including a fixed part, a movable part, a bobbin, and a driving assembly. The movable part is movably connected to the fixed part and holds the optical element. The bobbin is disposed on the fixed part or the movable part. The driving assembly drives the movable part to move (Continued)

relative to the fixed part and has a coil disposed on the bobbin. The fixed part has a main body, and the main body forms a recess for receiving the bobbin.

8 Claims, 7 Drawing Sheets

(51) Int. Cl.

| | |
|---|---|
| ***G02B 27/64*** | (2006.01) |
| ***G03B 3/10*** | (2021.01) |
| ***G03B 5/02*** | (2021.01) |
| ***H04N 23/54*** | (2023.01) |
| ***H04N 23/55*** | (2023.01) |

DRIVING MECHANISM

CROSS REFERENCE TO RELATED APPLICATIONS

This Application claims priority of provisional U.S. Patent Application Ser. No. 63/186,496, filed on May 10, 2021, the entirety of which is incorporated by reference herein.

BACKGROUND OF THE INVENTION

Field of the Invention

The application relates in general to a driving mechanism, and in particular, to a driving mechanism for moving an optical element.

Description of the Related Art

As technology has advanced, a lot of electronic devices (such as cameras and smartphones) have incorporated the functionality of taking photographs and recording video.

Conventional photo cameras, video cameras, and mobile phones usually comprise an optical system for capturing images. The optical system may vibrate due to external impact and cause deviation of the optical path, causing the images captured by the optical system to be blurry. Taiwan patent No. I457693 discloses a conventional optical image stabilization device. When the autofocus function is executed, a current is applied to the coil, and electromagnetic induction occurs between the coil and the magnet, so that the holder moves with respect to the base along the optical axis of the optical system. Two displacement sensors are disposed in the device to detect the position of the optical axis along the X and Y directions. When the optical axis deviates from the norm, electromagnetic induction can occur between the coils and the magnets, corresponding to the X and Y axes, so as to correct the position of the optical axis. However, owing to the miniaturization of the coils, the magnets, and the displacement sensors, the electromagnetic driving force and the displacement sensing accuracy can be reduced. Therefore, it is a challenge to achieve miniaturization of the electromagnetic mechanism without affecting performance.

BRIEF SUMMARY OF INVENTION

In view of the aforementioned problems, the object of the invention is to provide a driving mechanism that includes a driving mechanism that includes a fixed part, a movable part, a bobbin, and a driving assembly. The movable part is movably connected to the fixed part and holds an optical element. The bobbin is disposed on the fixed part or the movable part. The driving assembly drives the movable part to move relative to the fixed part and has a coil disposed on the bobbin. The fixed part has a main body, and the main body forms a recess for receiving the bobbin.

In some embodiments, the driving mechanism further includes a circuit unit, wherein the main body is located between the coil and the circuit unit.

In some embodiments, the main body further forms an opening, and the coil is offset relative to the center of the opening.

In some embodiments, the driving assembly has a plurality of magnets and coils, the magnets are disposed on the movable part, and the coils are disposed on the main body and the bobbin.

In some embodiments, the coils include a first coil and a second coil, the main body further forms a plurality of first protrusions, and the bobbin forms a plurality of second protrusions, wherein the first coil is wound around the first protrusions, and the second coil is wound around the second protrusions.

In some embodiments, the second protrusions have different sizes.

In some embodiments, the main body further forms a first curved surface, and the bobbin further forms a second curved surface connected to the first curved surface when the bobbin is joined in the recess.

In some embodiments, the main body forms two second protrusions, and one of the second protrusions is closer to the second curved surface and larger than the other second protrusion.

In some embodiments, the second coils protrude from the second curved surface.

In some embodiments, the main body further forms two first protruding portions, and the bobbin further forms two second protruding portions, wherein the ends of the first coil are wounded around the first protruding portions, and the ends of the second coil are wounded around the second protruding portions, wherein the first protruding portions have a first distance, the second protruding portions have a second distance, and the first distance is greater than the second distance.

In some embodiments, the driving mechanism further includes a circuit unit, wherein the main body is located between the coil and the circuit unit, the bobbin forms a hole, and the circuit unit has a substrate and a position sensor disposed on the substrate, wherein the position sensor is received in the hole.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as “top,” “bottom,” “left,” “right,” “front,” “back,” etc., is used with reference to the orientation of the figures being described. The components of the present invention can be positioned in a number of different orientations. As such, the directional terminology is used for the purposes of illustration and is in no way limiting.

Figure 1:
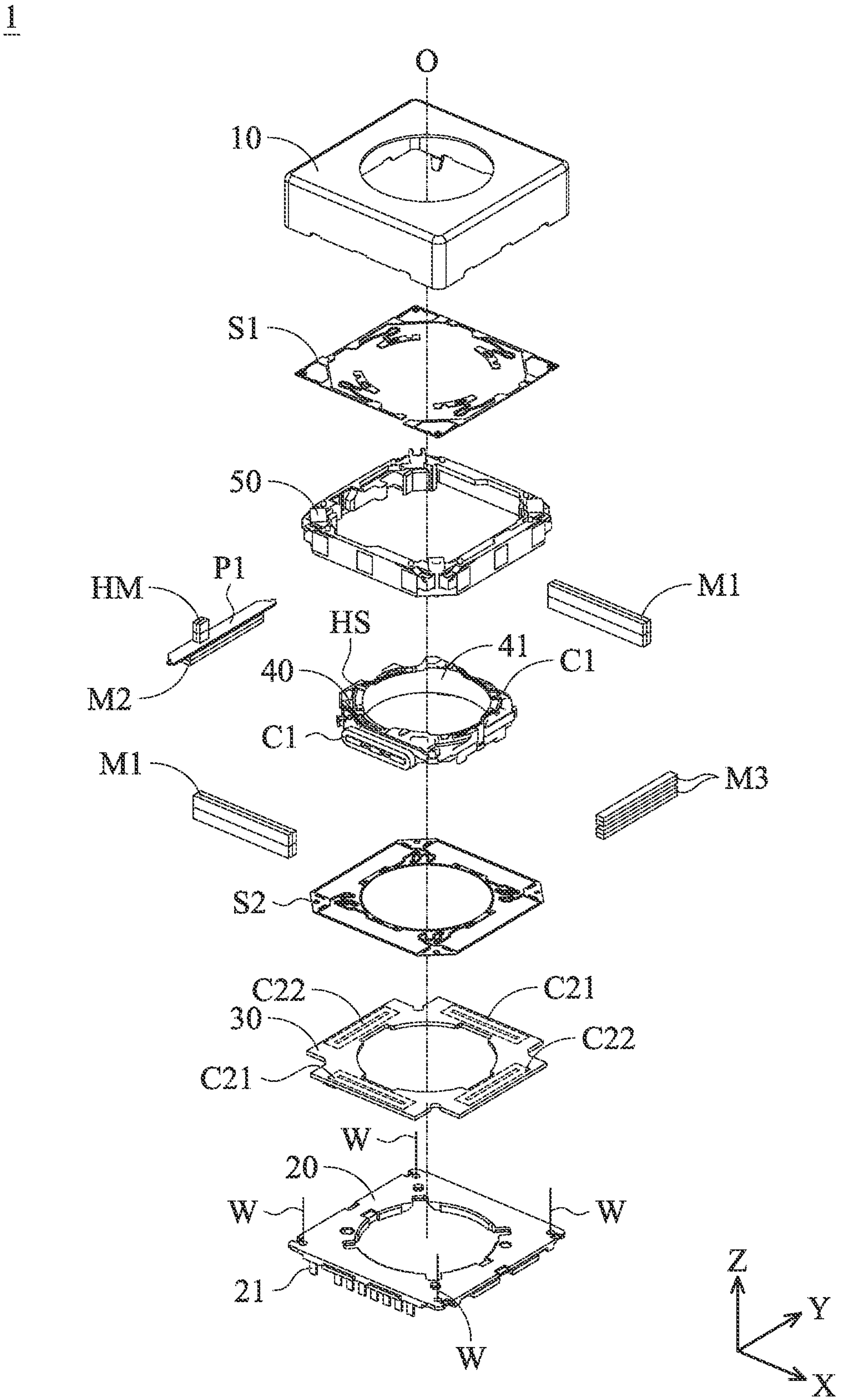
FIG. 1 shows an exploded view of a driving mechanism 1 in accordance with an embodiment of the invention.
Figure 2:
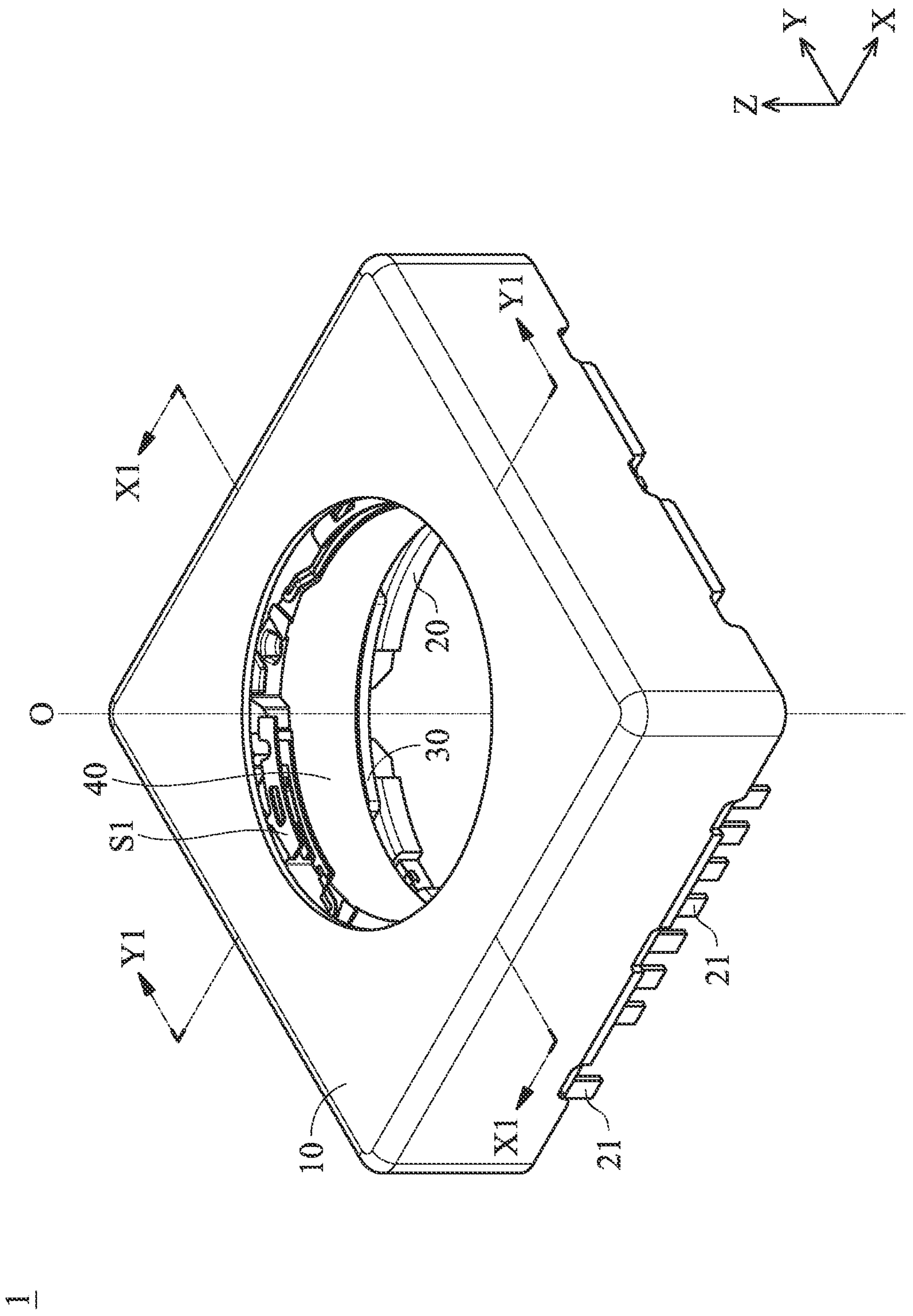
FIG. 2 shows a perspective diagram of the driving mechanism 1 in FIG. 1 after assembly.
Figure 3:
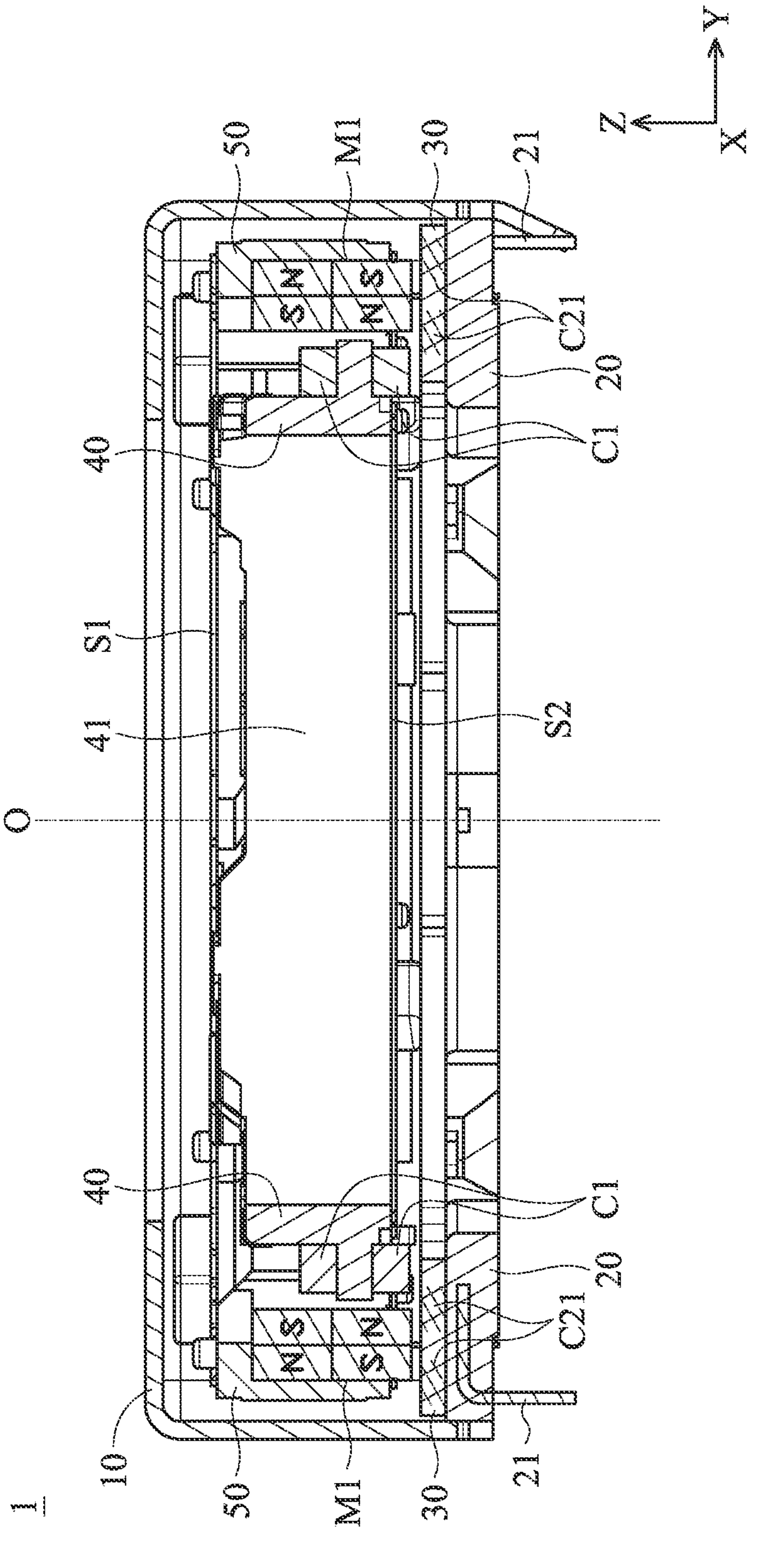
FIG. 3 shows a cross-sectional view taken along line X1-X1 in FIG. 2.
Figure 4:
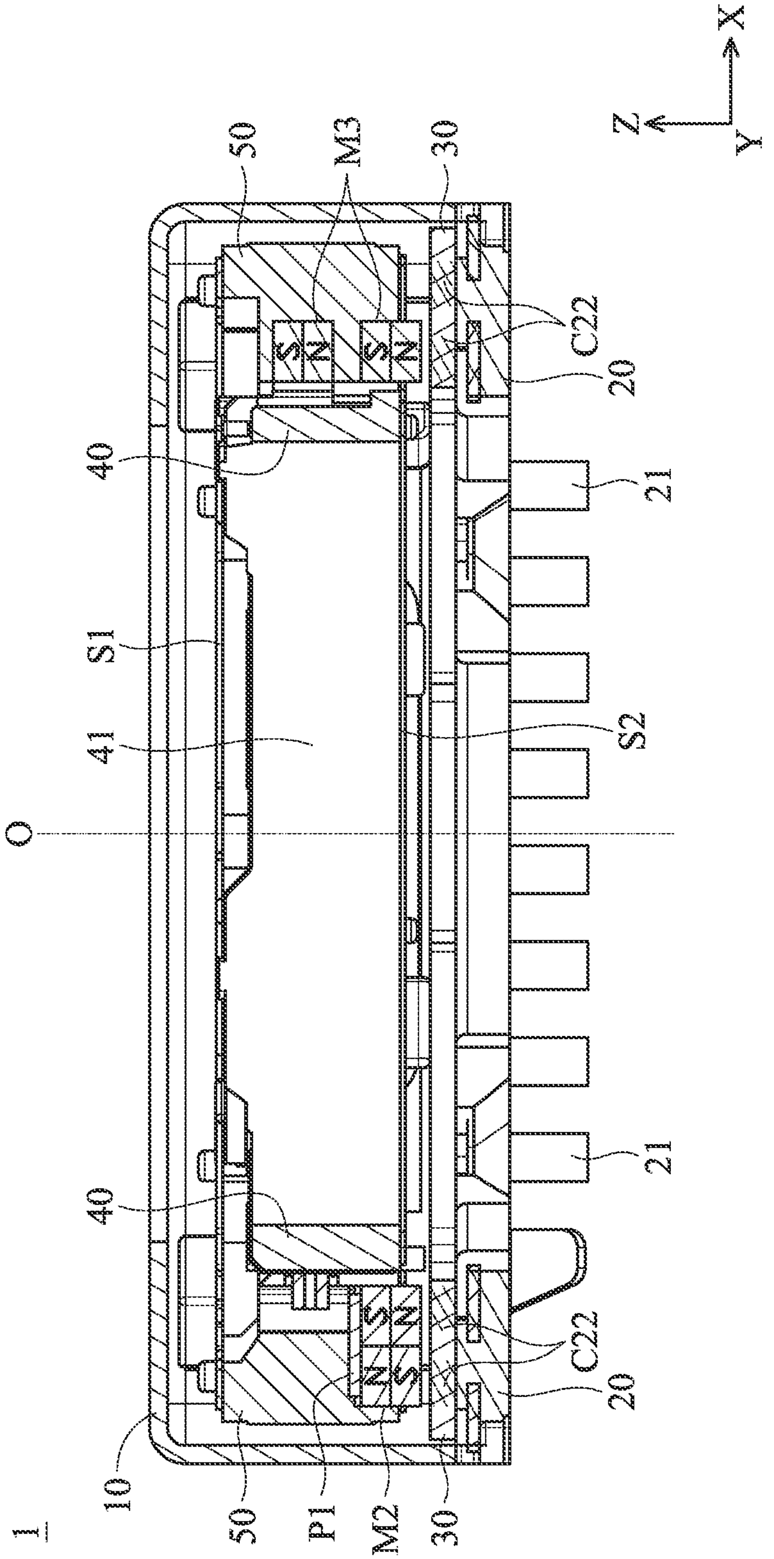
FIG. 4 shows another cross-sectional view taken along line Y1-Y1 in FIG. 2.

Referring to FIGS. 1-4, FIG. 1 shows an exploded view of a driving mechanism 1 in accordance with an embodiment of the invention, FIG. 2 shows a perspective diagram of the driving mechanism 1 in FIG. 1 after assembly, FIG. 3 shows a cross-sectional view taken along line X1-X1 in FIG. 2, and FIG. 4 shows another cross-sectional view taken along line Y1-Y1 in FIG. 2.

The driving mechanism 1 in this embodiment may be a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

As shown in FIG. 1, the driving mechanism 1 primarily comprises a housing 10, a base 20, a coil unit 30 (e.g. FPC), a holder 40, a frame 50, an upper spring S1, and a lower spring S2. In this embodiment, the housing 10 has a hollow structure affixed to the base 20, and the housing 10 and the base 20 can form a fixed part of the driving mechanism 1, wherein the coil unit 30 is affixed to the base 20. Additionally, the holder 40 and the frame 50 are movably received in the housing 10, and they can form a movable part of the driving mechanism 1, wherein an optical element (not shown) is disposed in an opening 41 of the holder 40. The frame 50, the holder 40, and the optical element in the holder 40 can be moved relative to the fixed part.

The holder 40 is connected to the frame 50 via the upper and lower springs S1 and S2, so that the holder 40 can be suspended within the frame 50. Moreover, the base 20 is connected to the frame 50 and the upper spring S1 via four resilient elements W, so that the frame 50 is movable within the housing 10. In some embodiments, the upper and lower springs S1 and S2 may comprise metal, and the resilient elements W may have a long and thin metal structure.

With the configuration as described above, external light can enter the driving mechanism 1 substantially along an optical axis O of the optical element, and light can propagate through the optical element to an image sensor (not shown) below the base 20 to form a digital image.

It should be noted that the frame 50, the holder 40 and the optical element received therein can move relative to the base 20 and the coil unit 30 along a first axis parallel to the XY plane, thereby achieving the function of OIS. Additionally, the holder 40 and the optical element received therein can move relative to the frame 50 along a second axis (Z axis) parallel to the optical axis O, thereby achieving the function of auto-focusing (AF).

As shown in FIGS. 1, 3, and 4, two oval-shaped coils C1 are disposed on opposite sides of the holder 40, and four coils C21 and C22 are respectively embedded on four sides of the coil unit 30. Moreover, several magnets M1, M2, and M3 are disposed on the four inner surfaces of frame 50. In this embodiment, the magnets M1 may be multipolar magnets, wherein the magnets M1 are located corresponding to the coils C1 on the holder 40 and the coils C21 embedded in the coil unit 30. The magnets M2 and M3 are located corresponding to the coils C22 embedded in the coil unit 30. For example, the coils C21 and C22 may comprise planar coils or FP-coils which are electrically connected to the conductive pins 21 under the base 20.

The upper spring S1 can be electrically connected to the coils C1 via conductive traces (not shown) on the holder 40, and the both ends of the four resilient elements W respectively connect to the upper spring S1 and the conductive traces (not shown) on the base 20. Therefore, an external circuit can provide an electrical current to the coils C1 on the holder 40 via the conductive pins 21 under the base 20. It should be noted that when a current signal is applied to the coils C1, an electromagnetic force can be generated by the coils C1 and the magnets M1, so that the holder 40 and the optical element received therein can be driven to move relative to the frame 50 along the Z axis (second axis) for auto-focusing (AF).

Similarly, the external circuit can also provide an electrical current to the coils C21 or C22 in the coil unit 30 via the conductive pins 21 under the base 20. When a current signal is applied to the coils C21 or C22, an electromagnetic force can be generated by the coils C21/C22 and the magnets M2/M3, so that the frame 50, the holder 40 and the optical element received therein can be driven to move relative to the base 20 and the coil unit 30 along a horizontal direction (first axis) for Optical Image Stabilization (OIS).

FIG. 1 further shows a magnetically conductive element P1 and a magnet HM disposed above the magnet M2 and affixed to the frame 50, and a magnetic field sensor HS is disposed on a side of the holder 40 which is electrically connected to the upper spring S1 for sensing the magnet HM. It should be noted that the magnetically conductive element P1 can change and improve the magnetic field distribution near the magnet M2, so as to reduce magnetic interference between the magnet M2 and other magnetic elements. For example, the magnetic field sensor HS may be a Hall effect sensor, MR sensor, or Fluxgate sensor to detect the position variation of the magnet HM, so that the relative movement between the holder 40 and the frame 50 along the Z axis can be determined promptly.

Referring to FIG. 4, two magnets M3 are arranged on a side of the holder 40 in the driving mechanism 1. The two magnets M3 are arrange along the Z axis, wherein their heights correspond to the heights of the upper and lower pars M11 and M12 of the magnet M1, and their direction of magnetization (N-S) is substantially parallel to the Z axis (second axis).

Figure 5:
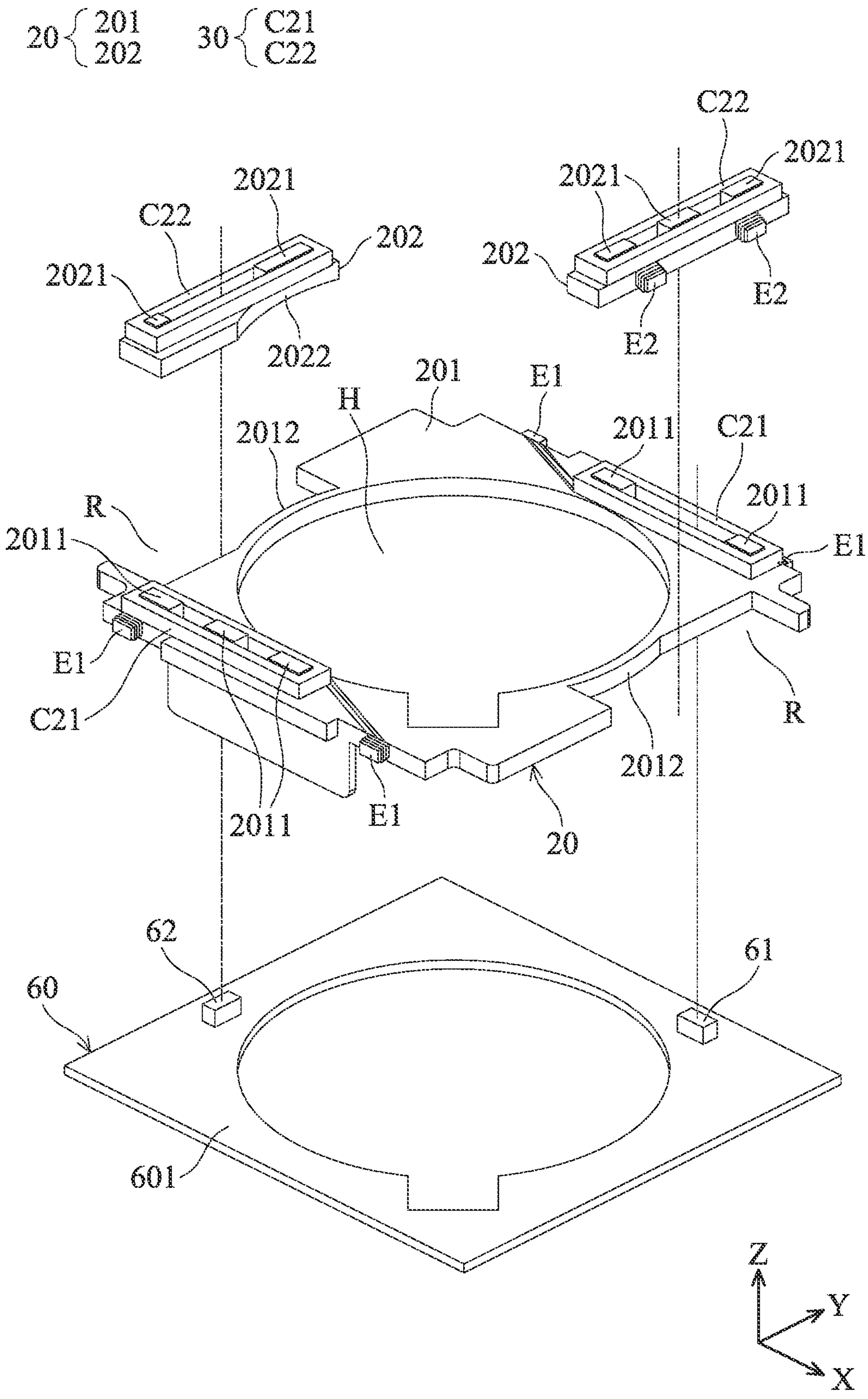
FIG. 5 shows an exploded view of the base 20, the coil unit 30, and the circuit unit 60, in accordance with another embodiment of the invention.
Figure 6:
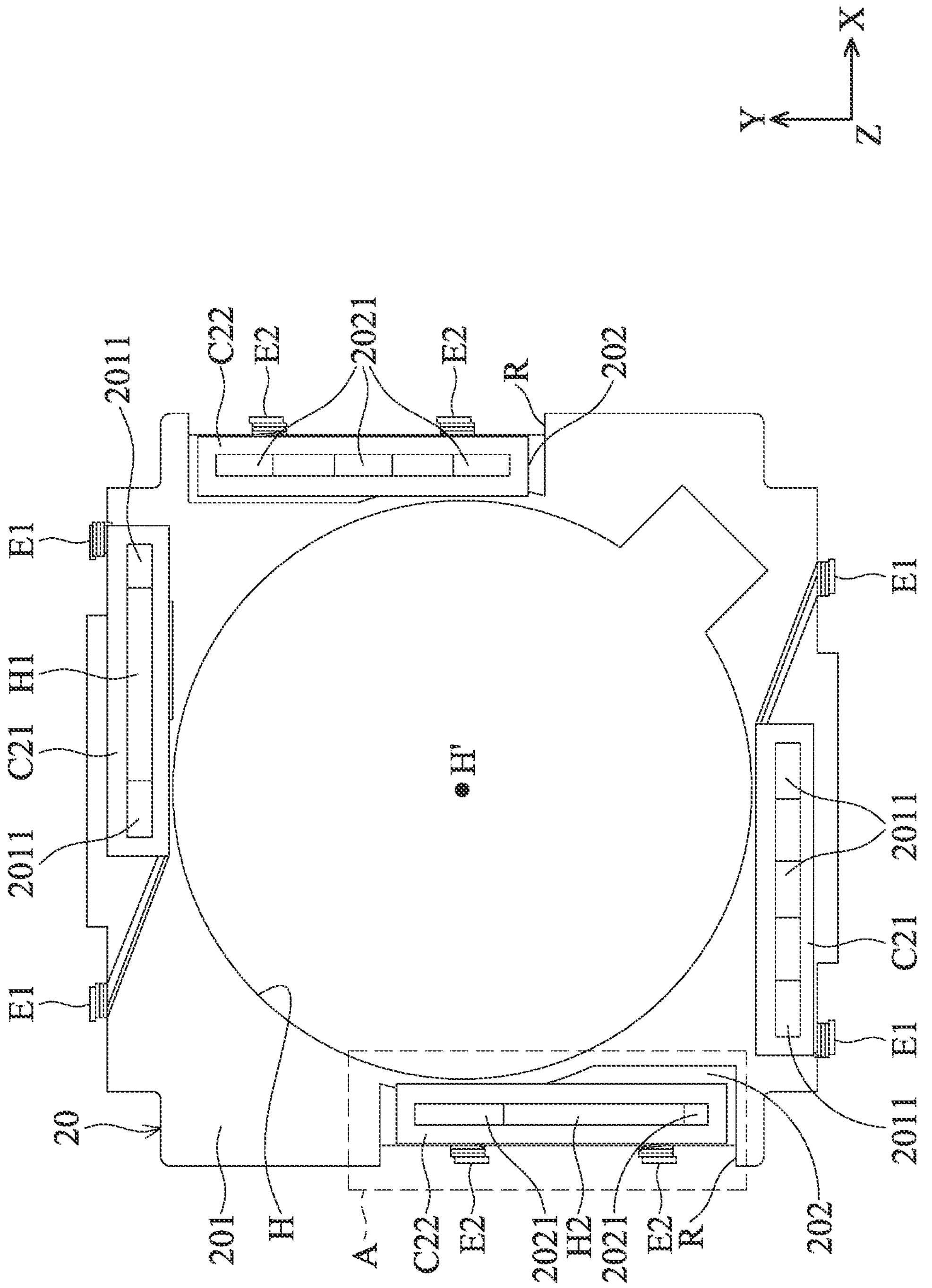
FIG. 6 is a top view of the base 20, the coil unit 30, and the circuit unit 60 in FIG. 5 after assembly.
Figure 7:
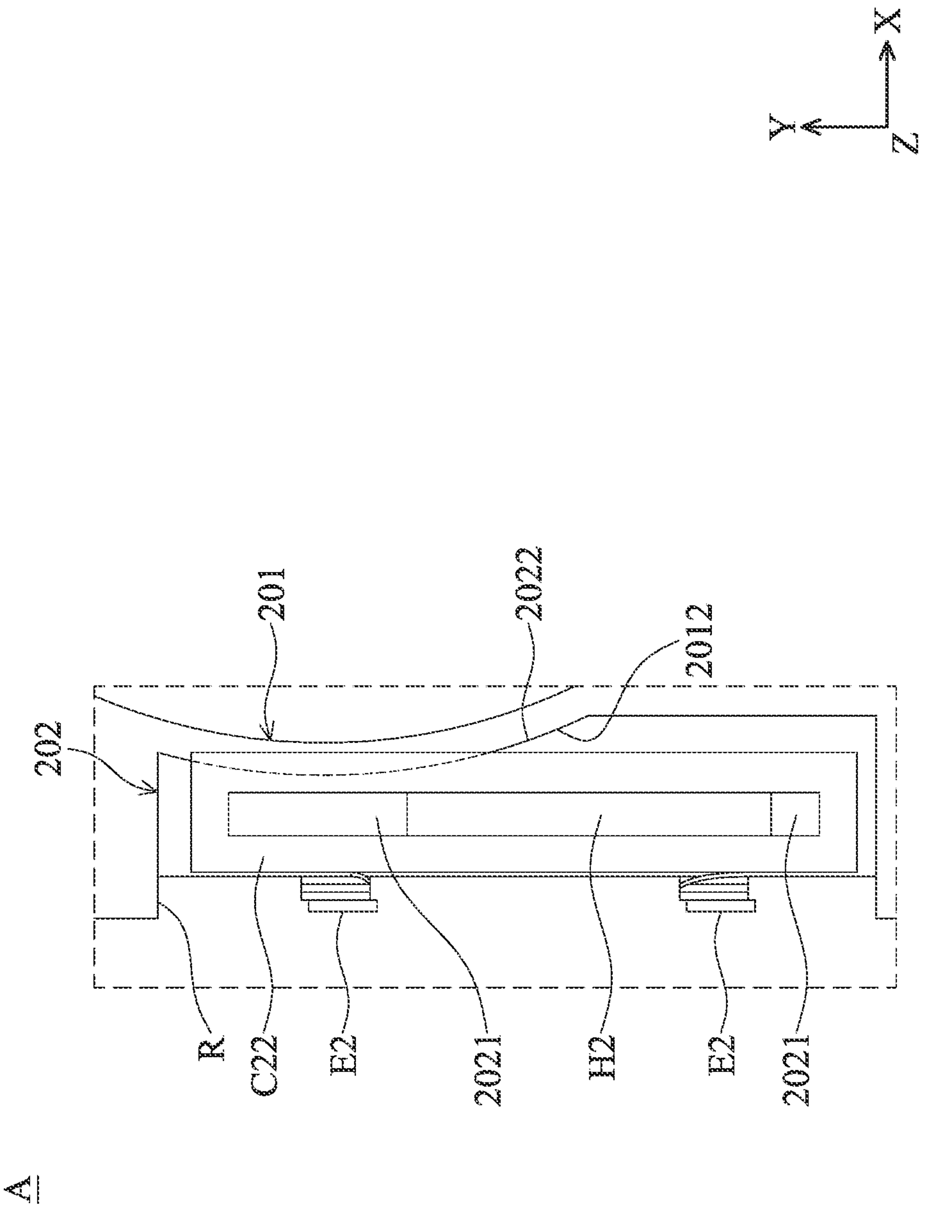
FIG. 7 is an enlarged view of the area A in FIG. 6.

FIG. 5 is an exploded view of the base 20, the coil unit 30, and the circuit unit 60, in accordance with another embodiment of the invention. FIG. 6 is a top view of the base 20, the coil unit 30, and the circuit unit 60 in FIG. 5 after assembly. FIG. 7 is an enlarged view of the area A in FIG. 6.

As shown in FIGS. 5 to 7, another embodiment of the base 20, the coil unit 30, and the circuit unit 60 can replace the base 20 and the coil unit 30 in FIGS. 1 to 4. The circuit unit 60 may be a flexible printed circuit (FPC) that includes a substrate 601 and two position sensors 61 and 62, and the base 20 is disposed between the coil unit 30 and the circuit unit 60.

This embodiment is different from FIGS. 1-4 in that the base 20 comprises a main body 201 and two longitudinal and flat bobbins 202, wherein the bobbins 202 can be mounted to the opposite sides of the main body 201 by adhesive.

It should be noticed that the coil unit 30 in this embodiment is not a flexible printed circuit (FPC). Here, the coil unit 30 includes a pair of coils C21 (first coils) and a pair of coils C22 (second coils). The coils C21, C22 and the magnets M1, M2, M3 can constitute a driving assembly for driving the movable part (the holder 40 and the frame 50) to move relative to the fixed part (housing 10 and the base 20) along the X and Y axes.

During assembly, the coils C21 can be wound around the protrusions 2011 (first protrusions) of the main body 201, and the coils C22 can be wound around the protrusions 2021 (second protrusions) of the bobbins 202. The coils C21 and C22 are located on the four sides of the rectangular or square base 20 after assembly.

Moreover, the main body 201 of the base 20 forms a substantially round opening H (FIGS. 5 and 6). Specifically, the coils C21 and C22 are offset from the center H' of the opening H in the X and Y directions, whereby the size of the base 20 can be reduced, and miniaturization of the driving mechanism 1 can be achieved.

As the coils C21 and C22 are close to each other and may increase the difficulty of the winding process, the bobbins 202 are provided in this embodiment to facilitate easy winding of the coils C22. During assembly, the coils C22 can be wound around the protrusions 2021 (second protrusions) of the bobbins 202, and the coils C21 can be wound around the protrusions 2011 (first protrusions) of the main body 201. Subsequently, the bobbins 202 can be secured in the recesses R on opposite sides of the main body 201 by adhesive, thereby facilitating convenient usage and miniaturization of the product.

In some embodiments, the driving mechanism 1 may comprise only one bobbin 202, wherein one of the coils C22 is wound on the bobbin 202, and the other three coils C21 and C22 are assembled to the main body 201, but the invention is not limited to the embodiments.

In some embodiments, at least one of the coils C1 shown in FIGS. 1 and 3 may be wound on a bobbin (not shown), and the bobbin is then affixed to a lateral side of the holder 40 (movable part) by adhesive. Hence, the bobbin becomes a part of the holder 40 for winding the coil C1, thus improving the efficiency of the winding process.

As shown in FIGS. 5-6, the protrusions 2011 (first protrusions) on the main body 201 may be arranged in a symmetrical or asymmetrical manner. Specifically, a hole H1 (FIG. 6) is formed between two adjacent protrusions 2011 and through the main body 201 for receiving the position sensor 61 on the substrate 601 of the circuit unit 60 (FIG. 5).

Similarly, as shown in FIGS. 5-7, the protrusions 2021 (second protrusions) of each bobbin 202 may also be arranged in a symmetrical or asymmetrical manner. Specifically, a hole H2 (FIG. 6) is formed between two adjacent protrusions 2021 and through the bobbin 202 for receiving the position sensor 62 on the substrate 601 of the circuit unit 60 (FIG. 5).

In this embodiment, the position sensors 61 and 62 can be used to detect the position of the magnets M1 and M2 relative to the base 20, whereby the displacement of the movable part (the holder 40 and the frame 50) relative to the fixed part (housing 10 and the base 20) along the X axis and the Y axes can be determined.

As shown in FIGS. 5-7, a first curved surface 2012 is formed on the outer side of the main body 201, and a second curved surface 2022 is formed on the inner side of the bobbin 202, corresponding to the first curved surface 2012. When the bobbin 202 is mounted to the main body 201, the first and second curved surfaces 2012 and 2022 are connected to each other, wherein the coil C22 protrudes from the second curved surface 2022 (FIG. 7). Hence, the space above the base 20 can be efficiently utilized by the coil unit 30 to facilitate miniaturization of the driving mechanism 1.

In FIG. 7, the hole H2 is formed between the two protrusions 2021 of the bobbin 202, wherein one of the protrusions 2021 close to the second curved surface 2022 is longer and larger than the other protrusion 2021. That is, the protrusions 2021 (second protrusions) of the bobbin 202 have different sizes and are arranged in a asymmetrical manner. As the second curved surface 2022 has a concave structure that may form a weak portion of the bobbin 202, one of the protrusions 2021 close to the second curved surface 2022 is longer and larger than the other protrusion 2021 to enhance the structural strength of the bobbin 202.

Still referring to FIGS. 5-7, the main body 201 of the base 20 has several first protruding portions E1 located on opposite sides thereof. The ends of the coils C21 can be wounded around the first protruding portions E1 to electrically connect to an external circuit. Similarly, each bobbin 202 has two second protruding portions E2, and the ends of the coils C22 can be wounded around the second protruding portions E2 to electrically connect to the external circuit.

Specifically, the first protruding portions E1 on the same side of the main body 201 have a first distance, and the second protruding portions E2 on each bobbin 202 have a second distance, wherein the first distance is greater than the second distance.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for driving an optical element to move, comprising:

a fixed part, having a main body that forms a recess, two first protrusions and a first curved surface;

a movable part, movably connected to the fixed part and holding the optical element;

a bobbin, joined in the recess of the fixed part, wherein the bobbin forms a second curved surface connected to the first curved surface, wherein the bobbin and the main body do not overlap when viewed along an optical axis of the optical element; and a driving assembly, driving the movable part to move relative to the fixed part, wherein the bobbin further forms two second protrusions, and one of the second protrusions is closer to the second curved surface and larger than the other second protrusion;

wherein the driving assembly includes a first coil wound around the first protrusions and a second coil wound around the second protrusions, and the second coil overlaps the first and second curved surfaces when viewed along the optical axis of the optical element.

2. The driving mechanism as claimed in claim 1, further comprising a circuit unit, wherein the main body is located between the first coil and the circuit unit.

3. The driving mechanism as claimed in claim 1, wherein the main body further forms an opening, and the first coil and the second coil are offset relative to a center of the opening.

4. The driving mechanism as claimed in claim 1, wherein the driving assembly has a plurality of magnets disposed on the movable part.

5. The driving mechanism as claimed in claim 1, wherein the second protrusions have different sizes.

6. The driving mechanism as claimed in claim 1, wherein the second coil protrudes from the second curved surface.

7. The driving mechanism as claimed in claim 1, wherein the main body further forms two first protruding portions, and the bobbin further forms two second protruding portions, wherein ends of the first coil are wounded around the first protruding portions, and ends of the second coil are wounded around the second protruding portions, wherein the first protruding portions have a first distance, the second protruding portions have a second distance, and the first distance is greater than the second distance.

8. The driving mechanism as claimed in claim 1, further comprising a circuit unit, wherein the main body is located between the first coil and the circuit unit, the bobbin forms a hole, and the circuit unit has a substrate and a position sensor disposed on the substrate, wherein the position sensor is received in the hole.

* * * * *